United States Patent
Chou et al.

[11] Patent Number: 6,150,495
[45] Date of Patent: Nov. 21, 2000

[54] SUPERABSORBING FIBERS AND FILMS AND PROCESS FOR PREPARING SAME

[75] Inventors: Yueting Chou, Chesterfield; Timothy Paul Feast, Wildwood; Jingen Zhang, Maryland Heights, all of Mo.

[73] Assignee: Solutia Inc., St. Louis, Mo.

[21] Appl. No.: 09/122,329

[22] Filed: Jul. 24, 1998

Related U.S. Application Data

[60] Provisional application No. 60/053,635, Jul. 24, 1997, and provisional application No. 60/062,306, Oct. 17, 1997.

[51] Int. Cl.$^7$ .......................... C08G 69/10; C08G 73/10; C08J 9/00

[52] U.S. Cl. .......................... 528/328; 528/363; 528/480; 528/170; 528/310; 528/322; 525/418; 525/420; 428/357; 428/395; 428/396; 428/473.5; 264/210.8; 264/331.1

[58] Field of Search ...................................... 528/170, 322, 528/328, 310, 363, 480; 525/418, 420; 264/210.8, 331.1; 428/357, 396, 395, 473.5

[56] References Cited

U.S. PATENT DOCUMENTS

| | | | |
|---|---|---|---|
| 5,247,068 | 9/1993 | Donachy et al. | 528/328 |
| 5,461,085 | 10/1995 | Nagatoma et al. | 528/328 |
| 5,612,384 | 3/1997 | Ross et al. | 528/328 |
| 5,847,013 | 12/1998 | Ross et al. | 528/328 |
| 5,856,427 | 1/1999 | Chou | 528/480 |
| 5,859,179 | 1/1999 | Chou | 528/328 |
| 5,889,072 | 3/1999 | Chou | 528/328 |
| 5,997,791 | 12/1999 | Chou | 528/480 |
| 5,998,491 | 12/1999 | Haar, Jr. | 521/64 |
| 5,998,492 | 12/1999 | Haar, Jr. et al. | 528/328 |

*Primary Examiner*—P. Hampton-Hightower
*Attorney, Agent, or Firm*—Gordon F. Sieckmann; Thompson Coburn LLP

[57] ABSTRACT

Superabsorbent fiber composition comprising partially hydrolyzed, internally plasticized, crosslinked, superabsorbing fibers derived from polysuccinimide and process for preparing same. Superabsorbent film composition comprising partially hydrolyzed, internally plasticized, crosslinked, superabsorbing film derived from polysuccinimide and process for preparing same.

40 Claims, No Drawings

SUPERABSORBING FIBERS AND FILMS AND PROCESS FOR PREPARING SAME

This application claims the benefit of priority under 37 C.F.R. §119(e) of U.S. Provisional Patent Application No. 60/053,635 filed Jul. 24, 1997 and the benefit of priority under 37 C.F.R. §119(e) of U.S. Provisional Patent Application No. 60/062,306 filed Oct. 17, 1997.

BACKGROUND OF THE INVENTION

This invention relates to superabsorbing polymers based on L-aspartic acid in synthetic fiber form and synthetic film form and to a process for preparing such fibers and such films.

Polysuccinimide (PSI) is prepared by thermal polycondensation of L-aspartic acid which can then be base-hydrolyzed to polyaspartate salt which has many industrial uses such as lubricant in metalworking fluids. Crosslinking PSI before or after hydrolysis renders the hydrolyzed salt superabsorbent in that it can absorb many times its weight of liquid such as water. This capability of absorbing significant quantities of fluids, including body exudates and aqueous compositions of all kinds, creates another important class of application for these polymers in products such as diapers, sanitary napkins, incontinence products, towels, tissues and the like. These superabsorbing polymers are in the prior art as typically disclosed in U.S. Pat. No. 5,461,085 (Nagatomo et al); U.S. Pat. No. 5,525,703 (Kalota) and U.S. Pat. No. 5,612,384 (Ross et al). Though articles of superabsorbing polymers derived from L-aspartic acid are recognized in this art as desirable, to date they are only disclosed in unshaped, particulate form as recovered from the hydrolysis step forming the salt.

In spite of the examples from the patents referenced above, there appears to be a continued absence in the art of these polymers in fiber form which is likely due to the important conflicting requirements of being sufficiently plastically extensible to permit drawing fiber while being crosslinked and hydrolyzed to create superabsorbency.

There also appears to be a continued absence in the art of these polymers in film form which is likely due to the important conflicting requirements of being sufficiently plastically extensible to permit film formation while being crosslinked and hydrolyzed to create superabsorbency.

In view of the noted applications, it would be highly desirable to provide biodegradable superabsorbent polymers derived from L-aspartic acid in fiber form and film form to facilitate formation into highly desired products such as diapers and the like.

The superabsorbent fibers and film of the present invention provide a solution to many problems encountered with unshaped, particulate superabsorbent polymers derived from L-aspartic acid. For example, the superabsorbent fibers of the invention have the advantages of (1) avoiding the problem of migration by having the ability to entangle with fluff pulp fibers, (2) being compatible with other fibers resulting in greater flexibility in applications and fabrication, and (3) having a large surface area resulting in a faster absorption rate.

The superabsorbent films of the invention have the advantage of avoiding the problem of migration by having the ability to remain stationary within an article containing the film.

SUMMARY OF THE INVENTION

Now, significant developments have been made in producing superabsorbent polymer fibers and superabsorbent polymer films derived from L-aspartic acid.

Accordingly, a principal object of this invention is to produce synthetic, superabsorbent fibers of L-aspartic acid derivatives.

Another object is to provide a method for producing such polymer fibers.

A further object is to chemically modify PSI to render it capable of drawing into fiber.

Yet another object is to provide an intermediate precursor for production of fibers based on PSI prepared from L-aspartic acid.

Another additional object is to provide a method for producing such polymer films.

A further additional object is to chemically modify PSI to render it capable of polymer film formation.

Yet another object is to provide an intermediate precursor for production of polymer films based on PSI prepared from L-aspartic acid.

Other objects will in part be clear and will in part appear from the following detailed description.

These and other objects are accomplished by the following multiple aspects of the invention.

i) A fiber-forming plastic composition must be sufficiently plastically extensible to permit drawing into a filament-like shape without fracture. It is difficult to draw crosslinked and hydrolyzed PSI which has not been further modified. This problem is remedied by one aspect of the invention by forming an uncrosslinked, non-hydrolyzed, internally plasticized poly(imide-co-amide) intermediate precursor which is useful in later forming such superabsorbing polymeric fibers. The intermediate is prepared by reacting a regulated amount of about 1 to about 20% of succinimide groups of the PSI with a minor, internally plasticizing amount of one or more monoamine compounds, such as diethanolamine. The partial amidation with the monoamine compound softens the polymer and facilitates subsequent drawing into fiber form. For example, the poly(imide-co-amide) intermediate produced using diethanolamine as the monoamine compound has repeating structural units represented by formula (1)

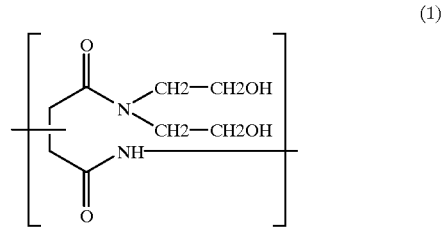

and repeating structural units represented by formula (2)

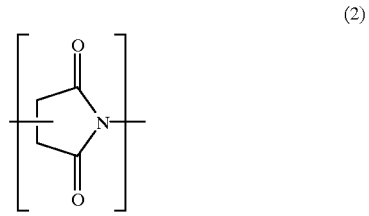

the mole fraction of repeating structural units represented by the formula (1) being about 0.01 to about 0.20.

ii) Since fiber-forming polymer cannot be effectively drawn when crosslinked, another aspect of the invention incorporates crosslinking agent into the composition before shaping fiber from the crosslinkable but uncrosslinked intermediate composition. Crosslinking succinimide groups of the polymer occurs after fiber formation in an after-treating or curing step by subjecting the fibers to crosslinking conditions to render them capable of superabsorbing. Premature crosslinking is minimized or avoided by incorporating heat reactive crosslinking agents into the composition at low temperature, i.e. from or about 0° C. to or about 75° C.

iii) Products of the process differ from those previously known in that the superabsorbing polymer is importantly in fiber form. The crosslinked fibers are of polyamide containing at least three divalent or polyvalent moieties randomly distributed along the polymer chain having the following formulas:

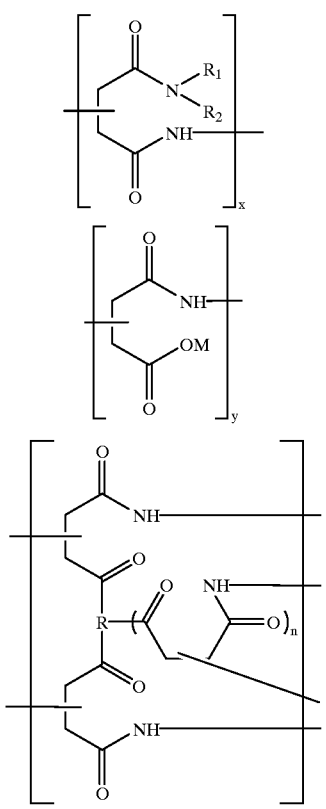

where M represents alkali metal cation, ammonium or quaternary ammonium, R represents a divalent or polyvalent crosslinker moiety, x, y and z represent mole fractions of the moieties in the polyamide and are respectively about 0.01 to about 0.20; about 0.60 to about 0.90 and about 0.01 to 0.30 wherein the sum of x, y and z is 1.0, and n is an integer varying independently from 0 to 4. $R_1$ and $R_2$ are substituents on the monoamine compound used for the internal plasticization of PSI and can be the same or different. Optionally, the superabsorbent polymer contains a minor amount of unreacted succinimide repeating units, i.e. repeating unit disclosed in formula (2) above. As used herein, a minor amount of succinimide repeating units is an amount up to that amount which has a detrimental effect on the absorbency properties of the superabsorbent fiber.

iv) In a specific aspect of the invention, a process is provided for preparing superabsorbing fibers which comprises the following steps in the recited sequence:
  i) condensation polymerizing L-aspartic acid to form polysuccinimide (PSI) having a weight average molecular weight of at least about 20,000 Daltons;
  ii) reacting about 1% to about 20% of the succinimide groups of the PSI with one or more monoamine compounds to form an internally plasticized poly(imide-co-amide) intermediate;
  iii) hydrolyzing about 60% to about 90% of the succinimide groups of the poly(imide-co-amide);
  iv) admixing crosslinker with the partially hydrolyzed poly(imide-co-amide) of iii) under non-crosslinking conditions to form a crosslinkable, uncrosslinked, partially hydrolyzed, internally plasticized PSI composition;
  v) drawing fibers from the composition of iv); and
  vi) subjecting the fibers to crosslinking conditions to crosslink uncrosslinked succinimide groups and form the superabsorbing fibers.

The above and other objects are accomplished by the following multiple aspects of the invention.
  i) A film-forming plastic composition must be sufficiently plastically extensible to permit film formation. It is difficult to form films from crosslinked and hydrolyzed PSI which has not been further modified. This problem is remedied by one aspect of the invention by forming an uncrosslinked, non-hydrolyzed, internally plasticized poly(imide-co-amide) intermediate precursor which is useful in later forming such superabsorbing polymeric films. The intermediate is prepared by reacting a regulated amount of about 1 to about 20% of succinimide groups of the PSI with a minor, internally plasticizing amount of one or more monoamine compounds, such as diethanolamine. The partial amidation with the monoamine compound softens the polymer and facilitates subsequent film formation. For example, the poly(imide-co-amide) intermediate produced using diethanolamine as the monoamine compound has repeating structural units represented by formula (1)

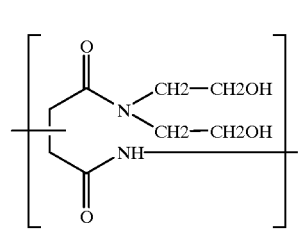

(1)

and repeating structural units represented by formula (2)

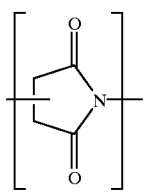

(2)

the mole fraction of repeating structural units represented by the formula (1) being about 0.01 to about 0.20.

ii) Since film-forming polymer cannot be effectively stretched or drawn when crosslinked, another aspect of the invention incorporates crosslinking agent into the composition before forming film from the crosslinkable but uncrosslinked intermediate composition. Crosslinking succinimide groups of the polymer occurs after film formation in an after-treating or curing step by subjecting the film to crosslinking conditions to render them capable of superabsorbing. Premature crosslinking is minimized or avoided by incorporating heat reactive crosslinking agents into the composition at low temperature, i.e. from or about 0° C. to or about 75° C.

iii) Products of the process differ from those previously known in that the superabsorbing polymer is importantly in film form. The crosslinked films are of polyamide containing at least three divalent or polyvalent moieties randomly distributed along the polymer chain having the following formulas:

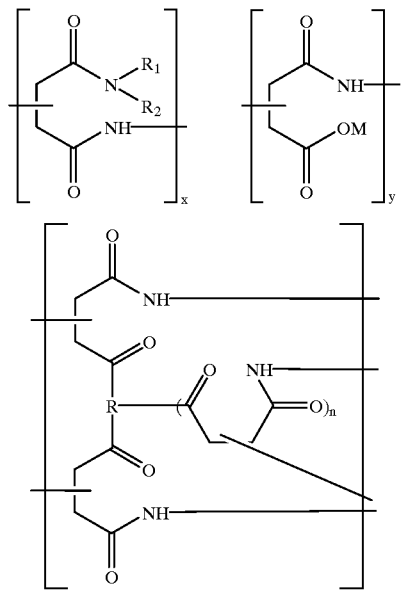

where M represents alkali metal cation, ammonium or quaternary ammonium, R represents a divalent or polyvalent crosslinker moiety, x, y and z represent mole fractions of the moieties in the polyamide and are respectively about 0.01 to about 0.20; about 0.60 to about 0.90 and about 0.01 to 0.30 wherein the sum of x, y and z is 1.0, and n is an integer varying independently from 0 to 4. $R_1$ and $R_2$ are substituents on the monoamine compound used for the internal plasticization of PSI and can be the same or different. Optionally, the superabsorbent polymer contains a minor amount of unreacted succinimide repeating units, i.e. repeating unit disclosed in formula (2) above. As used herein, a minor amount of succinimide repeating units is an amount up to that amount which has a detrimental effect on the absorbency properties of the superabsorbent film.

iv) In a specific aspect of the invention, a process is provided for preparing superabsorbing films which comprises the following steps in the recited sequence:
  i) condensation polymerizing L-aspartic acid to form polysuccinimide (PSI) having a weight average molecular weight of at least about 20,000 Daltons;
  ii) reacting about 1% to about 20% of the succinimide groups of the PSI with one or more monoamine compounds to form an internally plasticized poly (imide-co-amide) intermediate;
  iii) hydrolyzing about 60& to 90% of the succinimide groups of the poly(imide-co-amide);
  iv) admixing crosslinker with the partially hydrolyzed poly(imide-co-amide) of iii) under non-crosslinking conditions to form a crosslinkable, uncrosslinked, partially hydrolyzed, internally plasticized PSI composition;
  v) forming film from the composition of iv); and
  vi) subjecting the film to crosslinking conditions to crosslink uncrosslinked succinimide groups and form the superabsorbing film.

DETAILED DESCRIPTION OF THE INVENTION

Synthetic superabsorbing polymer fibers and polymer films of the invention are derived from L-aspartic acid starting monomer available commercially from Solutia, Inc., 10300 Olive Boulevard, P.O. Box 66760, St. Louis, Mo., 63166-6760. L-aspartic acid is conventionally condensation polymerized in the presence of catalyst such as phosphoric acid. Processes for preparing homopolymer polysuccinimide (PSI) are described in U.S. Pat. Nos. 5,057,597; 5,315,010 and 5,319,145. Molecular weight (weight average $M_w$) is preferably at least 20,000 and more preferably at least 30,000 up to or about 100,000 Daltons. Such relatively high molecular weight is achieved by driving the polycondensation reaction to as complete a level as commercially feasible using catalyst concentrations, reaction temperature and time at the high end of the ranges disclosed in these patents. Water of condensation is removed as it is formed as taught in U.S. Pat. No. 5,484,945 (Nagatomo et al) the disclosure in which is incorporated herein by reference. In a preferred procedure, polycondensation is conducted at reduced pressure and 180° C. in the presence of 85% phosphoric acid as described in U.S. Pat. No. 5,142,062 (Knebel et al) the disclosure of which is incorporated herein by reference. Succinimide ("S") groups of formula (2) are the repeating structural unit.

To permit formation of fibers from the composition (as will be later described), S groups of the PSI are next ring-opening reacted with one or more monoamine compounds having the formula $HNR_1R_2$ in an amount functionally effective to internally plasticize the PSI and form a poly(imide-co-amide) intermediate. $R_1$ represents a hydrogen atom or an alkyl or alkenyl group of 1 to 55 carbon atoms, preferably 1–30, which can be straight chain or branched and unsubstituted or substituted, and $R_2$ represents a hydrogen atom, —OH, an alkyl or alkenyl group of 1 to 55 carbon atoms, preferably 1–30, which can be straight chain or branched and unsubstituted or substituted. The alkyl or alkenyl groups of $R_1$ and $R_2$ optionally contain one or more hetero atoms selected from O, N and S. Optional substituents of the alkyl or alkenyl groups of $R_1$ and $R_2$ are common organic functional groups not interfering with the hydrolysis or crosslinking reactions of the invention such as one of the following: carboxyl (—COOH), hydroxyl (—OH), ether (—$OR_3$), amide (—$CONH_2$), tertiary amine (—$NR_3R_6$), chloride (—Cl) and ketone (—$COR_3$), wherein $R_3$ represents an alkyl or alkenyl group of 1 to 8 carbon atoms and $R_6$ represents an alkyl or alkenyl group of 1 to 8 carbon atoms, an aryl group of 6 to 10 carbon atoms, or a cycloalkyl group of 5 to 10 carbon atoms. Currently preferred substituents of the invention are —OH and —$OR_3$.

The amount of monoamine compound in the poly(imide-co-amide) is that amount necessary to achieve adequate internal plasticization of the PSI and varies with the specific monoamine chosen. The amount of monoamine necessary is readily determined by one of ordinary skill and is based on the properties of the specific monoamine, e.g. molecular weight. Using diethanolamine as the monoamine, the repeating structural unit is represented by formula (1) in combination with S groups of formula (2), the mole fraction of repeating structural units represented by formula (1) being about 0.01 to about 0.20. The internal plasticizer softens and provides the polymer with fiber-forming properties. Any compound containing one functional amino group which is reactable with PSI can be used to form the poly(imide-co-amide) intermediate and provide the internal plasticizing function. Compounds with two or more reactable amino groups tend to lead to crosslinking and therefore should be avoided. Other monoamino compounds interchangeably usable with the diethanolamine of the Example following illustratively include, but are not limited to, methylamine, ethylamine, propylamine, butylamine, pentylamine, hexylamine, O-(2-Aminopropyl)-O'-(2-methoxyethyl) polypropylene glycol 500 (Jeffamine® M-600), ethanolamine, neopentanolamine, 3-isononyloxypropylamine, 3-propanolamine, 2-methoxyethylamine, 3-methoxy-propylamine, 3-ethoxypropylamine, ethylhexoxy-propylamine, isopropanolamine, and diisopropanol-amine. Monoamine is reacted with PSI in a solvent mixture at a temperature adequate for succinimide ring-opening which is typically about 40° C. to 70° C. Suitable solvents for the succinimide ring-opening reaction are water, polar organic solvents such as dimethylformamide (DMF), dimethylsulfoxide, and N-methyl-2-pyrrolidone (NMP), and non-polar organic solvents such as toluene and hexane. The preferred solvents for the succinimide ring-opening reaction are water and polar organic solvents, with water being the most preferred solvent. Using diethanolamine the reaction is illustrated as follows:

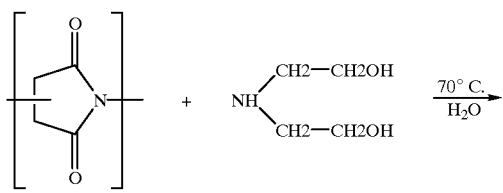

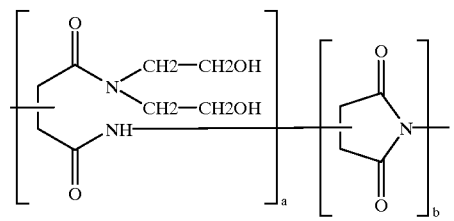

wherein a and b represent the mole fractions of the respective repeating structural units, and a is 0.01 to 0.20 and b is 0.99 to 0.80.

Internally plasticized PSI or poly(imide-co-amide) is next partially hydrolyzed with a regulated amount of base sufficient to form salt from about 60 to about 90% but not all S groups of the poly(imide-co-amide), leaving about 1 to 30% unhydrolyzed for later crosslinking. The repeating unit of hydrolyzed succinimide, i.e. aspartate, has the following structure:

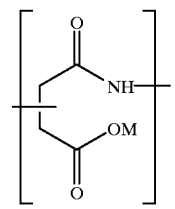

where M is an alkali metal cation such as $Na^+$, $K^+$, $Li^+$, ammonium or quaternary ammonium. This partial hydrolysis is accomplished by reacting the poly(imide-co-amide) reaction product of the prior process step with a suitable base, e.g. alkali metal hydroxide, ammonium hydroxide, and the like, in a suitable solvent selected from water, polar organic solvents such as DMF, DMSO and NMP, non-polar organic solvents such as toluene and hexane, and mixtures thereof. The currently preferred solvent is water and the currently preferred base is sodium hydroxide. In a preferred embodiment, this partial hydrolysis is conveniently accomplished by adding aqueous base solution in situ to the poly(imide-co-amide) reaction product of the prior process step. In the preferred embodiment, the partially hydrolyzed, internally plasticized PSI is totally dissolved in water solution after completion of the hydrolysis. Hydrolysis occurs at room temperature or, to reduce reaction time at elevated hydrolysis temperature typically up to about 75° C., until the desired level of S ring opening occurs.

Crosslinker for eventually crosslinking unopened succinimide rings is then admixed under non-crosslinking conditions into the solution of partially hydrolyzed poly(imide-co-amide) to form a crosslinkable, uncrosslinked, partially hydrolyzed, internally plasticized, PSI composition. In the preferred embodiment, crosslinker is admixed under non-crosslinking conditions into an aqueous solution of partially hydrolyzed poly(imide-co-amide) to form a crosslinkable, uncrosslinked, partially hydrolyzed, internally plasticized, PSI composition. According to the invention, crosslinking is delayed until after fiber formation, but crosslinker is added before fiber formation to insure that the crosslinker is evenly distributed throughout the partially hydrolyzed, internally plasticized PSI solution. Adding crosslinker to the solution while minimizing or avoiding crosslinking is accomplished by doing so at or about room temperature (22° C.–25° C.) down to or about 0° C. This relatively low temperature protects against premature crosslinking before fiber formation and can vary with the crosslinking activity, or reactivity, of the crosslinker. Such non-crosslinking temperature conditions are chosen to avoid significant development of gel which occurs when crosslinked polyaspartate salt absorbs solvent, e.g. water, from the solution. Such gel should be avoided since fibers cannot effectively be drawn from a gel-containing partially hydrolyzed, internally plasticized PSI composition.

Suitable crosslinkers for the succinimide groups of poly (imide-co-amide) according to the invention are polyamines. As used herein, polyamines include compounds having two or more amine groups, e.g. diamines, triamines, and tetraamines. The polyamine crosslinkers of the invention are represented by the formula $X-R_4-(Y)_m$ wherein X and Y are independently selected from $NH_2$, $NHR_5$, $NHNH_2$, $C(=O) NHNH_2$, and $C(=NH) NH_2$; m is an integer from 1 to 9; and $R_4$ can be absent or selected from i) linear, branched or cyclic unsubstituted or substituted alkylene, alkenylene or arylalkylene groups having 1 to 30 carbon atoms optionally containing one or more heteroatoms selected from O, N and S, and ii) divalent aromatic groups having 6 to 26 carbon atoms optionally substituted with an OH or $OR_5$ group wherein $R_5$ is linear or branched alkyl or alkenyl having 1 to 12 carbon atoms. Typical are organic diamines such as those recited in U.S. Pat. No. 5,612,384 (Ross et al), the disclosure of which at col. 5, line 23 through col. 6, line 50 is incorporated herein by reference. Other suitable crosslinkers include hexamethylene diamine, 4-aminomethyl-1,8-diaminooctane (abbreviated as triaminononane or TAN), trizane, tetrazane, lysine, ornithine, cystine, cystamine, guanidine, oxalic dihydrazide, 1,2,3-tris (3-aminopropoxy)propane where $R_4$ has 14 carbons, O is heteroatom, X and Y are $NH_2$, and m is 2, arylalkyl aminohydrazine of the formula $NH_2NHCH_2CH_2PhCH_2CH_2CH_2NH_2$ where $R_4$ has 11 carbons, X is $NHNH_2$, Y is $NH_2$, m is 1 and Ph is 1,4-phenylene, 4-aminobenzamidine where $R_4$ has 6 carbons, X is $NH_2$, Y is $C(=NH) NH_2$ and m is 1, tris(2-aminoethyl) amine, and mixtures thereof. The polyamine crosslinker is preferably used in anhydrous (neat), undiluted, virgin form as a solid or liquid, but alternatively can be a component of a dilute or concentrated solution, dispersion or suspension. A preferred triamine is triaminononane (TAN) and preferred diamines are hexamethylene diamine and lysine. The amount of crosslinker according to the invention is that amount which is sufficient to crosslink a portion of the remaining unopened rings of S groups of the poly(imide-co-amide) precursor representing about 1 to about 30%, preferably about 5 to about 15%, and most preferably about 10% of those in the initial homopolymer PSI. The succinimide groups crosslinked during curing comprise from about 1 to about 30%, preferably about 5 to about 15% of total succinimide groups originally present in the PSI. This amount and the resulting eventual level of crosslinking renders the polymer of the fibers superabsorbing in being capable of absorbing from at least 3 times to more than 100 times their weight of water. Though not wishing to be bound to any particular structure, it is believed the crosslinking agent exists as an unreacted component in the uncrosslinked composition which may be intimately admixed with the balance of the components of the composition, or at most is chemically reacted via one imide group of the amine to one S ring but not to two which would create a crosslink undesirably leading to gel formation.

At this stage a partially hydrolyzed, internally plasticized, uncrosslinked intermediate polysuccinimide composition also exists for formation into fibers (or films, in a manner to be described later herein on page 24 and continuing), in a manner immediately to be described which comprises:

i) repeating, internally plasticizing structural units represented by formula (3)

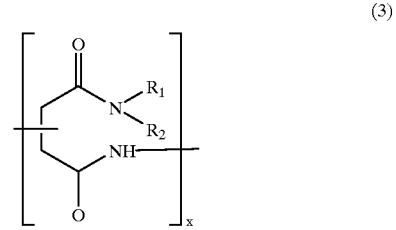

(3)

ii) repeating succinimide structural units represented by formula (4)

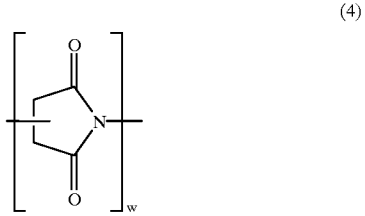

(4)

iii) repeating aspartate structural units represented by formula (5)

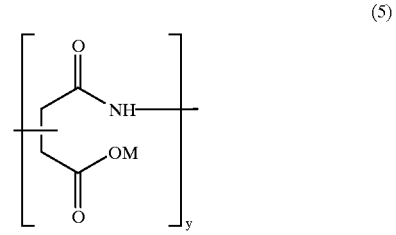

(5)

iv) crosslinking agent, as described herein, capable under crosslinking reaction conditions of crosslinking succinimide units of formula (4), wherein M represents alkali metal, ammonium or quaternary ammonium, $R_1$ and $R_2$ are as defined above, and x, w and y represent the mole fractions of structural units (3), (4) and (5) and are respectively about 0.01 to about 0.20; about 0.30 to about 0.01 and about 0.60 to 0.90 wherein the sum of x, w and y is 1.0.

The uncrosslinked solution, which is preferably an aqueous solution, is thickened to about 50% polymer solids concentration and a thin film of this concentrated mixture (solution) manually applied with a spatula or pipette at room (about 22° C.) temperature to the surface of a 2.5×15 cm metal plate. A second plate of equal dimension is pressed against the film on the first plate and as the two plates with the interposed film of concentrated mixture are manually moved apart at a slow rate at room temperature, the film is drawn into single, long, thin, filament-like shapes which are initially joined to each plate but then fracture as the plates move further apart to form elongated, shaped fibers. The unreacted crosslinker present on the surface of the polymer fibers (albeit possibly reacted to one S group as noted above) is substantially homogeneously distributed. The fibers (which are essentially non-superabsorbing at this stage) are subjected to crosslinking conditions of elevated temperature and time sufficient to cure and crosslink uncrosslinked S groups of the polymer and provide the fibers with superabsorbing capability. An alternative fiber-forming system employing a spinning die to continuously form and then cure fibers according to this invention is described in U.S. Pat. No. 4,855,179 (Bourland et al), the fiber-forming and curing disclosure of which is incorporated herein by reference in its entirety.

In a preferred method of spinning, the SAP fiber precursor is stored in the reservoir which is pressured under 30 psi of nitrogen. The precursor is an aqueous solution containing about 70% polyaspartate copolymer and about 7% polyamine crosslinker. A preheated precursor is pumped to the spinneret through a heated tubing and is extruded through the spinneret to form nice fiber filaments. Heating lamps are applied to remove water from the wet filaments.

Products of the curing step are partially hydrolyzed, internally plasticized, crosslinked, superabsorbing fibers derived from polysuccinimide. The crosslinked fibers are formed of polyamide containing at least three divalent or polyvalent moieties randomly distributed along the polymer chain of the following formulas:

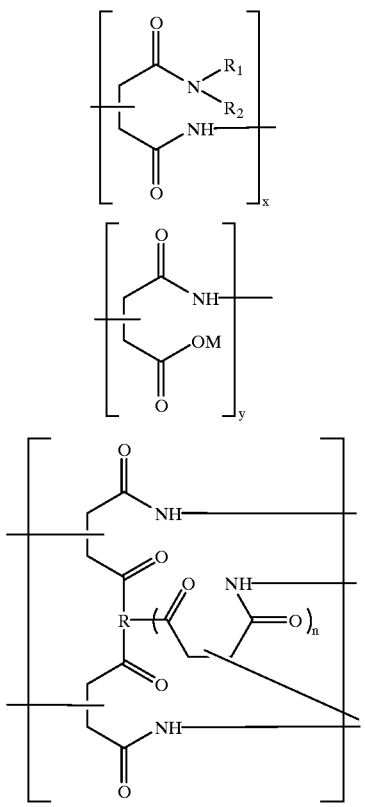

where M represents alkali metal cation, ammonium or quaternary ammonium, R represents a divalent or polyvalent crosslinker moiety derived from the polyamine crosslinker used, x, y and z represent mole fractions of the moieties in the polyimide and are respectively about 0.01 to about 0.20; about 0.60 to about 0.90 and about 0.01 to about 0.30 wherein the sum of x, y and z is 1.0, and n is an integer from 0 to 4. $R_1$ and $R_2$ are substituents on the monoamine compound used for the internal plasticization of PSI and can be the same or different. Optionally, the superabsorbent polymer contains a minor amount of unreacted succinimide repeating units, i.e. repeating unit disclosed in formula (2) above.

The superabsorbent fibers of the invention are useful in the manufacture of moisture absorbent articles, such as disposable diapers, sanitary napkins, incontinence garments, bandages, absorbent liners in meat packing trays, pet tray liners, and the like. The superabsorbent fibers of the invention are particularly useful in the manufacture of thin or ultra-thin disposable diapers which have excellent moisture absorbance capacity, fluid distribution properties and reduced leakage. The superabsorbent fibers of the invention are also useful directly or in non-woven sheet or matting form for agricultural or gardening materials such as water-holding materials for soils, e.g. mixing the fibers directly with soil. The sheet or matting form can also be used for seedlings and landscaping applications.

In making absorbent articles with the superabsorbent fibers of the invention, the fibers may be mixed with, attached to, layered in, or dispersed in a porous matrix of fibers. In one embodiment, the superabsorbent fibers of the invention are combined with other fibers to form a nonwoven material. The superabsorbent fibers of the invention can be combined with hydrophilic fibers such as cellulose pulp or fluff, cotton liners, and synthetic fibers or a mixture of the fibers and the cellulose fluff. The fibers can be loose or joined as in nonwovens. Suitable synthetic fibers include, but are not limited to, polyesters, copolymers of polyesters and polyamides, polyvinyl alcohol and the like. The synthetic fibers may be meltblown fibers or fibers which have been treated to render them hydrophilic. Additionally, the superabsorbent fibers of the invention may be incorporated in the absorbent article in a compartment or localized area in the absorbent structure.

Absorbent articles for use in hygienic and sanitary products, such as disposable diapers, are made with a liquid-impermeable backing material, a liquid-permeable bodyside facing material and the liquid-absorbing material sandwiched between the backing material and the facing material. The liquid-impermeable backing material can be made from commercially available polyolefin film and the liquid-permeable facing material can be made from a commercially available nonwoven material, such as spunbonded or corded fibrous web which is wettable and capable of passing the fluid to be absorbed, e.g. urine.

The absorbent articles of the invention may comprise about 5% to about 90% by weight, preferably about 20% to about 70% by weight, of the superabsorbent fibers of the invention. In an absorbent article, where the superabsorbent fibers of the invention are utilized with other fibers in a matrix, such as a nonwoven material, the superabsorbent fiber of the invention is present in an amount from about 30 to about 70 weight percent of the total fiber matrix. In another form of absorbent article, the superabsorbent fiber may be present in a containment structure in which the superabsorbent fiber of the invention is present in an amount of about 30 to about 90 percent by weight.

As referred to previously on page 19 hereof, a partially hydrolyzed, internally plasticized, uncrosslinked intermediate polysuccinimide composition exists for formation into film in a manner about to be described which comprises:

i) repeating, internally plasticizing structural units represented by formula (3)

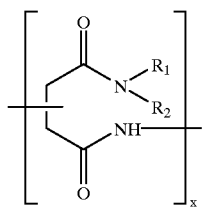

(3)

ii) repeating succinimide structural units represented by formula (4)

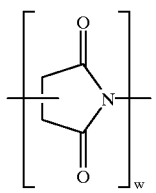

(4)

iii) repeating aspartate structural units represented by formula (5)

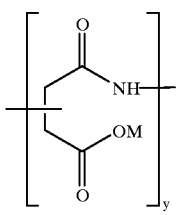

(5)

iv) crosslinking agent, as described herein, capable under crosslinking reaction conditions of crosslinking succinimide units of formula (4), wherein M represents alkali metal, ammonium or quaternary ammonium, $R_1$ and $R_2$ are as defined above, and x, w and y represent the mole fractions of structural units (3), (4) and (5) and are respectively about 0.01 to 0.20; about 0.30 to 0.01 and about 0.60 to 0.90 wherein the sum of x, w and y is 1.0.

The uncrosslinked solution, which is preferably an aqueous solution, can be formed into a film by any conventional film-forming process. For example, the uncrosslinked solution can be thickened, e.g. to about 5% to about 50%, preferably about 10% to about 30%, polymer solids concentration, extruded into a gas atmosphere while evaporating the solvent to form the film, the film stretched, and then the film so formed crosslinked. The concentration of the polymer in the uncrosslinked solution is selected, having regard to the molecular weight of the polymer, so as to give a solution having a viscosity that is convenient for extrusion through the extrusion die being used.

In another embodiment, the solution can be deposited upon a support to form a wet film of the solution. The nature of the support is not critical and may be selected from a variety of materials depending on the particular application including, but not limited to, polymeric (e.g. in extruded, film and porous matrix forms), ceramic, glass, or metallic supports. The preferred supports are the polymeric supports, particularly those in porous matrix form. Numerous techniques are available for the application of the solution to the support as will be apparent to those skilled in the art. For example, the polymer solution may be simply poured upon a level support in a quantity sufficient for it to achieve the desired uniform thickness. A blade may then be drawn over the surface of the wet film to aid the deposition of the wet film of uniform thickness. The thickness of the wet film deposited upon the support is determined by the desired thickness of the film ultimately produced. Generally, the wet film is deposited upon the support in a substantially uniform thickness of about 2 to about 30 mils, preferably about 4 to about 10 mils. A quantity of solvent is next evaporated from the exposed surface of the wet film to allow the formation of a relatively thin solid layer of the exposed surface of the film. During the formation of the solid layer of the exposed surface of the film, the solvent present near the surface of the wet film is flashed off and a thin coagulated skin of polymer remains. The evaporation of solvent from the exposed surface of the wet film may be accomplished by a variety of techniques as will be readily apparent to those skilled in the art. For example, a stream of air or other gas at ambient or an elevated temperature below the point at which the polymer in the film will crosslink may be simply directed at the exposed surface of the wet film. The time required to form the desired thin solid layer upon the exposed surface of the wet film commonly ranges from about 30 minutes to about 5 hours, preferably about 30 minutes to about 1 hour. The film is then crosslinked as described herein.

Products of the curing step are partially hydrolyzed, internally plasticized, crosslinked, superabsorbing films derived from polysuccinimide. The crosslinked films are formed of polyamide containing at least three divalent or polyvalent moieties randomly distributed along the polymer chain of the following formulas:

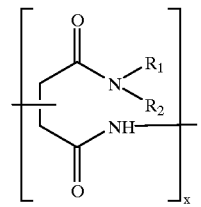

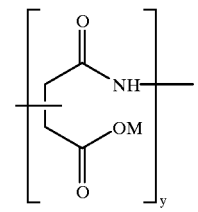

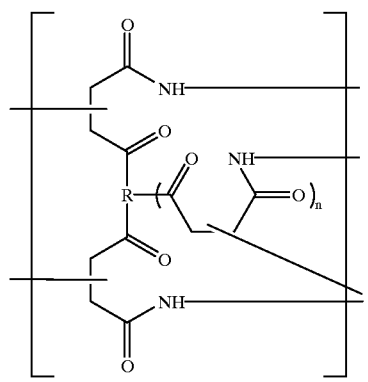

where M represents alkali metal cation, ammonium or quaternary ammonium, R represents a divalent or polyvalent crosslinker moiety derived from the polyamine crosslinker used, x, y and z represent mole fractions of the moieties in the polyimide and are respectively about 0.01 to 0.20; about 0.60 to 0.90 and about 0.01 to 0.30 wherein the sum of x, y and z is 1.0, and n is an integer from 0 to 4. $R_1$ and $R_2$ are substituents on the monoamine compound used for the internal plasticization of PSI and can be the same or different. Optionally, the superabsorbent polymer contains a minor amount of unreacted succinimide repeating units, i.e. repeating unit disclosed in formula (2) above.

The superabsorbent films of the invention are useful in the manufacture of moisture absorbent articles, such as disposable diapers, sanitary napkins, incontinence garments, bandages, absorbent liners in meat packing trays, pet tray liners, and the like. The superabsorbent films of the invention are particularly useful in the manufacture of thin or ultra-thin disposable diapers which have excellent moisture absorbance capacity, fluid distribution properties and reduced leakage. The superabsorbent films of the invention are also useful directly or attached to a porous matrix for agricultural or gardening materials such as water-holding materials for soils. The sheet or matting form can particularly be used for seedlings and landscaping applications.

In making absorbent articles with the superabsorbent films of the invention, the films may be attached to or layered in a porous matrix of fibers or a porous film. The superabsorbent films of the invention can be combined with hydrophilic fiber matrices comprising cellulose pulp or fluff, cotton liners, and synthetic fibers or a mixture of the fibers and the cellulose fluff. Suitable synthetic fibers include, but are not limited to, polyesters, copolymers of polyesters and polyamides, polyvinyl alcohol and the like. The synthetic fibers may be meltblown fibers or fibers which have been treated to render them hydrophilic. Additionally, the superabsorbent films of the invention may be incorporated in the absorbent article in a compartment or localized area in the absorbent structure.

Absorbent articles for use in hygienic and sanitary products, such as disposable diapers, are made with a liquid-impermeable backing material, a liquid-permeable bodyside facing material and the liquid-absorbing material sandwiched between the backing material and the facing material. The liquid-impermeable backing material can be made from commercially available polyolefin film and the liquid-permeable facing material can be made from a commercially available nonwoven material, such as spunbonded or corded fibrous web which is wettable and capable of passing the fluid to be absorbed, e.g. urine.

The absorbent articles of the invention may comprise about 5% to about 90% by weight, preferably about 20% to about 70% by weight, of the superabsorbent films of the invention. In an absorbent article, where the superabsorbent films of the invention are utilized in a matrix, such as a nonwoven material, the superabsorbent film of the invention is present in an amount from about 30 to about 70 weight percent of the total matrix. In another form of absorbent article, the superabsorbent film may be present in a containment structure in which the superabsorbent film of the invention is present in an amount of about 30 to about 90 percent by weight.

EXAMPLES

The invention is further described in the following Examples which is not intended to limit or restrict the invention. Unless otherwise indicated all quantities are expressed in weight.

The tea bag test measuring superabsorbence referred to in the Example is conducted as follows: about 0.2 gm of a sample is placed in a tea bag-like pouch (2"×2") of non-woven fabric and stapled. The tea bag is subjected to a 15 second immersion in a 0.9% saline solution, one minute drip dry and weighing, followed by a 2 min. 45 sec. immersion, one min. drip dry and weighing, and then an additional 7 min. immersion, one min. drip dry and weighing. The absorbencies for 15 seconds, 3 minutes and 10 minutes are calculated according to the following equation and the 10 min. value reported as superabsorbing performance. Absorbency in gm/gm=(weight of the tea bag with treated sample minus weight of the wet tea bag minus weight of the untreated sample)/weight of the untreated sample.

Example 1

Preparation of Sample 4: 1 gm (10.3 mmol) polysuccinimide (MW=97,000 daltons by GPC), 0.11 gm (1.03 mmol) diethanolamine and 30 gm of water were added to a round bottom flask. The mixture was stirred at 50° C. for 3 hours and 2.9 ml of 10% (by w/v) NaOH solution (7.21 mmol) added and held for another 3 hours at 50° C. After the reaction mixture was cooled to 0° C., 0.12 gm (0.69 mmol) of TAN solution (in 10 ml water) was slowly added to reaction mixture. The reaction mixture was stirred for another 2 hours at 0° C. and undissolved particles removed by filtration. Water was evaporated to concentrate the mixture to a thick solution (about 50% polymer solid). A thin film of the above mixture was then applied between two metal plates. Fibers were formed as the plates were manually drawn away from each other. The fibers were then after-treated in an oven at elevated temperature of 180° C. for 30 minutes to crosslink the composition of the fibers. Samples of the partially hydrolyzed, internally plasticized, crosslinked, superabsorbing fibers derived from polysuccinimide were subjected to the tea bag test for absorbency described above. One gram of fiber absorbed about 30 grams of saline solution as shown for sample 4 in Table 2.

Preparation of Samples 1–3, 5 and 6: In subsequent runs using the above procedure, ethanolamine or butylamine was substituted for diethanolamine and produced poly(imide-co-amide)s displaying similar increased fiber-forming capability during successful formation of fibers having substantially equal superabsorbing properties after crosslinking as measured using the tea bag test. The following crosslinkers were also used in subsequent runs; tris(2-aminoethyl)amine, 4-aminomethyl-1,8-diamino-octane (TAN), lysine, tetraethylene-pentamine, and 1,6-hexamethylene-diamine.

Preparation of Sample 7: 1 gm (10.3 mmol) polysuccinimide (MW=97,000 daltons by GPC), 0.10 gm (0.0167 mmol) Jeffamine® M-600 and 30 gm of water were added to a round bottom flask. The mixture was stirred at 50° C. for 3 hours and 3.3 ml of 10% (by w/v) NaOH solution (8.5 mmol) added and held for another 2 hours at 50° C. After the reaction mixture was cooled to 0° C., 0.15 gm (1.03 mmol) of lysine.2HCl solution (in 10 ml water) was slowly added to reaction mixture. The reaction mixture was stirred for another 2 hours at 0° C. and undissolved particles removed by filtration. Water was evaporated to concentrate the mixture to a thick solution (about 50% polymer solid). Another 0.15 gm (1.03 mmol) of lysine.2HCl was slowly added to the reaction mixture. The reaction mixture was then stirred until a clear solution was obtained. A thin film of the above mixture was then applied between two metal plates. Fibers were formed as the plates were manually drawn away from each other. The fibers were then after-treated in an oven at elevated temperature of 200° C. for 30 minutes to crosslink the composition of the fibers. Samples of the partially hydrolyzed, internally plasticized, crosslinked, superabsorbing fibers derived from polysuccinimide were subjected to the tea bag test for absorbency described above. One gram of fiber absorbed about 27 grams of saline solution as shown for sample 7 in Table 2.

The runs are all summarized in the following table (Table I).

TABLE 1

| Sample Number | Monoamine/ % INPAA[1] | Crosslinker/ % XPAA[2] | % NaPAA[3] |
|---|---|---|---|
| 1 | Ethanolamine/10 | tris (2-amino ethyl)amine/20 | 70 |
| 2 | Ethanolamine/10 | TAN/20 | 70 |
| 3 | Ethanolamine/10 | lysine.2HCl/40 | 70 |
| 4 | Diethanolamine/10 | TAN/6.66 | 70 |
| 5 | Diethanolamine/10 | TEP[4]/4 | 70 |
| 6 | Butylamine/10 | HDA[5]/10 | 80 |
| 7 | Jeffamine M-600/1.6 | lysine.2HCl/20 | 80 |

[1]% INPAA is the % of the succinimide groups that were internally plasticized with the monoamine.
[2]% XPAA is the % of the succinimide groups in the original PSI that were crosslinked.
[3]% NaPAA is the % of the succinimide groups that were hydrolyzed.
[4]Tetraethylenepentamine.
[5]1,6-hexamethylenediamine.

The absorbency test results as determined using the tea bag test described above are shown in Table 2 below.

TABLE 2

| Sample Number | Absorbency[1] in Saline (0.9%) | | |
|---|---|---|---|
| | 15 Sec | 3 min | 10 min |
| 1 | 19.1 | 21.5 | 21.8 |
| 2 | 22.3 | 28.6 | 28.8 |
| 3 | 14.6 | 14.8 | 16.4 |
| 4 | 29.5 | 29.6 | 31.0 |
| 5 | 24.9 | 26.3 | 27.8 |
| 6 | 26.5 | 29.9 | 30.3 |
| 7 | 25.5 | 27.6 | 27.4 |

[1]Absorbency in grams liquid per gram dry sample.

Example 2

This example suggests that the fibers prepared according to Example 1 are biodegradable.

Superabsorbent fiber samples reported in Table 1 above were tested to determine their biodegradability.

The following experimental procedure was utilized to determine the biodegradability of the superabsorbent fiber samples.
1. Weighed out approximately 25 grams of Drummer soil (a silt loam soil having 18% sand, 62% silt and 20% clay with pH (1:1 soil:$H_2O$) of 6.7 and % organic carbon of 1.80) which had been passed through a #12 sieve into each of 12 soil biodegradation flasks.
2. Added aliquot of sample into appropriate flask.
3. Added 25 mL of deionized water to each flask.
4. Placed a vial containing 10 mL of 0.3 N barium hydroxide into side chamber in each soil biodegradation test flask.
5. Purged each test flask with air containing 70% oxygen and 30% nitrogen.
6. Stoppered flasks with silicone stoppers.
7. Placed flasks on rotary shaker. Rotary shaker was enclosed so that light cannot enter.
8. At selected time intervals removed barium hydroxide traps and replaced with fresh barium hydroxide and again purged units with 70% oxygen:30% nitrogen air and stopper.
9. Barium hydroxide removed from test flasks was titrated with hydrochloric acid. The total amount of carbon dioxide yielded was calculated. The amount of carbon dioxide yielded from blank soils is subtracted from total to calculate amount of carbon dioxide yielded due to sample.

The greater the $CO_2$ yielded as a % of theoretical, the greater the biodegradability of the sample.

TABLE 3

| | $CO_2$ Yield as % of Theoretical | | |
|---|---|---|---|
| Days | Sample 1 | Sample 2 | Sample 3 |
| 6 | 8 | 3 | 4 |
| 13 | 12 | 5 | 5 |
| 21 | 16 | 6 | 7 |
| 28 | 20 | 7 | 8 |
| 36 | 24 | 8 | 9 |
| 41 | 26 | 9 | 11 |
| 47 | 28 | 9 | 11 |

Example 3

This example shows that the fibers can be prepared through a spinneret unit.

Into a round bottom flask was added 200 gm (2.06 mol) polysuccinimide (MW=97,000 daltons by GPC), 12.6 gm (0.0206 mol) ethanolamine and 1000 gm of water. The mixture was stirred at 50° C. for 3 hours. Then 132 g (1.65 mol) of 50% (by w/w) NaOH solution was added and the mixture was cooked for another 3 hours. The reaction mixture was cooled to room temperature, and 25 g (0.206 mol) TAN was slowly added to the reaction mixture. The reaction mixture was stirred at room temperature for another 2 hr. The undissolved particles were removed by filtration. The filtrate was concentrated to a thick solution (about 70% solid).

This SAP fibers precursor was extruded through a spinneret. The temperature of the precursor at the spinneret was around 90° C. The temperature of the spin precursor reservoir was around 70° C. The temperature of the region right below the spinneret was around 150° C. By using heating lamps, it was able to effectively remove the water from the wet filament to produce dry fibers. Such fibers were heated in an oven at about 190° C. for 30 min. to complete the crosslinking. Samples of the final product were taken for the standard teabag test for absorbency in saline solution. One gram of this SAP fiber can absorb about 21 grams of saline solution.

Example 4

5 gm (51.5 mmol)polysuccinimide (MW=42,000 daltons by GPC), 0.38 gm (5.15 mmol)butylamine and 100 gm of water are added to a round bottom flask. The mixture is stirred at 50° C. for 2 hours and 17 ml of 10% (by w/v) NaOH solution (42.5 mmol) added and held for another 2 hours at 50° C. The undissolved particles removed by filtration. Water is evaporated to concentrate the mixture to a thick solution (about 20% polymer solid). Then 0.30 gm (1.73 mmol)of TAN solution slowly added to reaction mixture. The above mixture is then cast on glass plates and put into 70° C. oven overnight. The films are then after-treated in an oven at elevated temperature of 180° C. for 45 minutes to crosslink the composition of the films. Samples of the partially hydrolyzed, internally plasticized, crosslinked, superabsorbing films derived from polysuccinimides are subjected to the tea bag test for absorbency. One gram of film absorbs about 20 grams of saline solution.

Other aspects of the invention are defined as follows.

A process for preparing superabsorbing fibers which comprises: i) drawing fibers from an internally plasticized, partially hydrolyzed, crosslinkable, uncrosslinked polysuccinimide (PSI) composition; and ii) curing the fibers to crosslink succinimide groups of the PSI composition of i) to render the fibers superabsorbent. The succinimide groups crosslinked during curing comprise from about 1 to about 30% of total succinimide groups originally present in the PSI.

A process for rendering polymer fibers superabsorbent which comprises curing fibers of an internally plasticized, partially hydrolyzed, crosslinkable PSI composition to crosslink the composition.

In a composition capable of forming fibers containing a fiber-formable polymer, the improvement wherein the polymer is a partially hydrolyzed, internally plasticized, crosslinkable polysuccinimide.

A process for forming a partially hydrolyzed, internally plasticized poly(imide-co-amide) which comprises (a) reacting polysuccinimide with about 1 to about 20 mole percent of a monoamine having the formula $HNR_1R_2$ to produce a poly(imide-co-amide); wherein $R_1$ is a hydrogen atom or an alkyl or alkenyl group of 1 to 55 carbon atoms which can be straight chain or branched and unsubstituted or substituted, and $R_2$ is a hydrogen atom, —OH, or an alkyl or alkenyl group of 1 to 55 carbon atoms which can be straight chain or branched and unsubstituted or substituted; wherein the alkyl or alkenyl groups of $R_1$ and $R_2$ optionally contain one or more hetero atoms selected from O, N and S; and wherein the optional substituents of the alkyl or alkenyl groups of $R_1$ and $R_2$ are selected from carboxyl, hydroxyl, ether, amide, tertiary amine, chloride or ketone; and (b) reacting the poly(imide-co-amide) of step (a) with a suitable base to hydrolyze about 60 to 90% of the succinimide groups of the poly(imide-co-amide) of step (a) to produce a partially hydrolyzed poly(imide-co-amide). As used herein, about 1 to about 20 mole percent of a monoamine is based on the number of moles of succinimide repeating units in the polysuccinimide, i.e. the mole ratio of monoamine to succinimide repeating units is about 0.01 to about 0.2. In a further embodiment, the partially hydrolyzed poly(imide-co-amide) of step (b) is contacted with a crosslinker under non-crosslinking conditions to form a partially hydrolyzed, crosslinkable poly(imide-co-amide).

The invention is a marked departure from the level of ordinary skill in the art by providing PSI derivatives in superabsorbing fiber form usable alone or in combination with other components (including fibers) in superabsorbing applications.

A process for preparing superabsorbing film which comprises: i) forming film from an internally plasticized, partially hydrolyzed, crosslinkable, uncrosslinked polysuccinimide (PSI) composition; and ii) curing the film to crosslink succinimide groups of the PSI composition of i) to render the film superabsorbent. The succinimide groups crosslinked during curing comprise from about 1 to about 30% of total succinimide groups originally present in the PSI.

A process for rendering polymer film superabsorbent which comprises curing film of an internally plasticized, partially hydrolyzed, crosslinkable PSI composition to crosslink the composition.

In a composition capable of forming film containing a film-formable polymer, the improvement wherein the polymer is a partially hydrolyzed, internally plasticized, crosslinkable polysuccinimide.

A process for forming a partially hydrolyzed, internally plasticized poly(imide-co-amide) which comprises (a) reacting polysuccinimide with about 1 to about 20 mole percent of a monoamine having the formula $HNR_1R_2$ to produce a poly(imide-co-amide); wherein $R_1$ is a hydrogen atom or an alkyl or alkenyl group of 1 to 55 carbon atoms which can be straight chain or branched and unsubstituted or substituted, and $R_2$ is a hydrogen atom, —OH, or an alkyl or alkenyl group of 1 to 55 carbon atoms which can be straight chain or branched and unsubstituted or substituted; wherein the alkyl or alkenyl groups of $R_1$ and $R_2$ optionally contain one or more hetero atoms selected from O, N and S; and wherein the optional substituents of the alkyl or alkenyl groups of $R_1$ and $R_2$ are selected from carboxyl, hydroxyl, ether, amide, tertiary amine, chloride or ketone; and (b) reacting the poly(imide-co-amide) of step (a) with a suitable base to hydrolyze about 60% to about 90% of the succinimide groups of the poly(imide-co-amide) of step (a) to produce a partially hydrolyzed poly(imide-co-amide). As used herein, about 1 to about 20 mole percent of a monoamine is based on the number of moles of succinimide repeating units in the polysuccinimide, i.e. the mole ratio of monoamine to succinimide repeating units is about 0.01 to about 0.2. In a further embodiment, the partially hydrolyzed poly(imide-co-amide) of step (b) is contacted with a crosslinker under non-crosslinking conditions to form a partially hydrolyzed, crosslinkable poly(imide-co-amide).

The invention is a marked departure from the level of ordinary skill in the art by providing PSI derivatives in superabsorbing film form usable alone or in combination with other components in superabsorbing applications.

The preceding description is for illustration only and should not be taken as limiting. Various modifications and alterations will be readily suggested to persons skilled in the art. It is intended, therefore, that the foregoing be considered as exemplary only.

What is claimed is:

1. A process for preparing superabsorbing polyamide fibers comprising:
   i) reacting about 1 to about 20% of the succinimide groups of a polysuccinimide (PSI) with one or more monoamines to form an internally plasticized poly(imide-co-amide) intermediate;
   ii) hydrolyzing about 60 to 90% of the succinimide groups of the poly(imide-co-amide) intermediate of i);
   iii) admixing crosslinker with the partially hydrolyzed poly(imide-co-amide) of ii) under non-crosslinking conditions to form a crosslinkable, uncrosslinked, partially hydrolyzed, internally plasticized PSI composition;
   iv) drawing fibers from the composition of iv); and
   v) subjecting the fibers to crosslinking conditions to crosslink a portion of uncrosslinked succinimide groups and form the superabsorbing polyamide fibers.

2. The process of claim 1 wherein the starting polysuccinimide has a weight average molecular weight of at least about 20,000 Daltons.

3. The process of claim 2 wherein the polysuccinimide of i) is prepared by condensation polymerizing L-aspartic acid.

4. The process of claim 1 wherein the succinimide groups crosslinked in step v) comprise about 1 to about 30% of the total succinimide groups present in the starting PSI.

5. A process for preparing a partially hydrolyzed, internally plasticized polysuccinimide (PSI) composition comprising:
   i) reacting about 1 to about 20% of the succinimide groups of a polysuccinimide polymer having a weight average molecular weight of at least about 20,000 Daltons with one or more monoamines to form an internally plasticized poly(imide-co-amide) intermediate; and ii) hydrolyzing about 60 to about 90% of the succinimide groups of the poly(imide-co-amide) intermediate.

6. The process of claim 5 further comprising:

iii) admixing crosslinker with the partially hydrolyzed poly(imide-co-amide) of ii) under non-crosslinking conditions to form a crosslinkable, uncrosslinked, partially hydrolyzed, internally plasticized PSI composition.

7. The process of claim 6 further comprising:

iv) drawing fibers from the composition of iii).

8. A process for preparing superabsorbing polyamide fibers which comprises:

i) drawing fibers from an internally plasticized, partially hydrolyzed, crosslinkable, uncrosslinked polysuccinimide (PSI) composition; and ii) curing the fibers to crosslink succinimide groups of the PSI composition of i) to render the fibers superabsorbent.

9. The process of claim 8 wherein the succinimide crosslinked in step ii) comprise about 1 to about 30% of the total succinimide groups present in the PSI prior to internal plasticization and partial hydrolysis.

10. An internally plasticized, partially hydrolyzed, uncrosslinked poly(imide-co-imide) composition useful in forming superabsorbing polymeric fibers or films comprising repeating structural units of

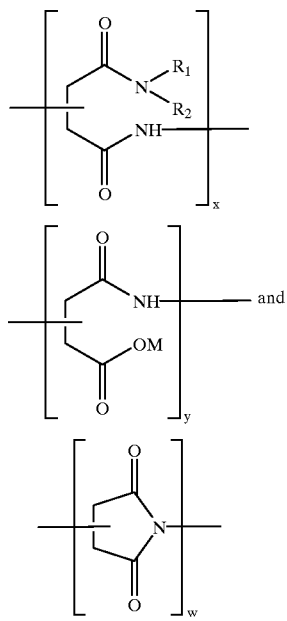

and wherein x, y and w represent the molar fractions of repeating structural units of the moieties in the internally plasticized, partially hydrolyzed, uncrosslinked poly(imide-co-amide), and are respectively about 0.01 to 0.20, about 0.60 to 0.90 and about 0.01 to 0.30 wherein the sum of x, y and w is 1.0;

wherein M is an alkali metal cation, ammonium or quaternary ammonium;

wherein $R_1$ represents a hydrogen atom or a straight chain or branched, unsubstituted or substituted alkyl or alkenyl group of 1 to 55 carbon atoms, and $R_2$ represents a hydrogen atom, —OH, or a straight chain or branched, unsubstituted or substituted alkyl or alkenyl group of 1 to 55 carbon atoms; wherein the alkyl or alkenyl groups of $R_1$ and $R_2$ optionally contain one or more hetero atoms selected from O, N and S, and are optionally substituted with common organic functional groups not interfering with the hydrolysis reaction.

11. The composition of claim 10 wherein said composition comprises a dry composition or substantially dry composition.

12. The composition of claim 10 wherein said composition comprises an aqueous solution.

13. The composition of claim 10 further comprising a polyamine crosslinking agent.

14. Partially hydrolyzed, internally plasticized, crosslinked, superabsorbing fibers derived from polysuccinimide.

15. The fibers of claim 14 comprising a polyamide having at least three divalent or polyvalent moieties randomly distributed along the polymer chain having the following formulas:

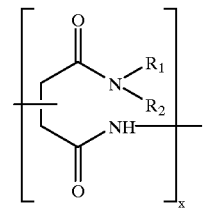

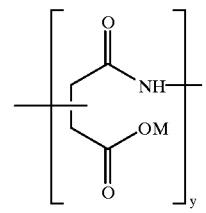

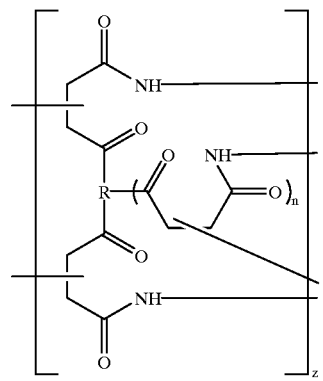

wherein M represents an alkali metal cation, ammonium or quaternary ammonium, R represents a divalent or polyvalent crosslinker moiety, x, y and z represent mole fractions of the moieties in the polyamide and are respectively about 0.01 to 0.20; about 0.60 to 0.90 and about 0.01 to 0.30 wherein the sum of x, y and z is 1.0, and n is an integer from 0 to 4;

wherein $R_1$ represents a hydrogen atom or a straight chain or branched, unsubstituted or substituted alkyl or alkenyl group of 1 to 55 carbon atoms, and $R_2$ represents a hydrogen atom, —OH, or a straight chain or branched, unsubstituted or substituted alkyl or alkenyl group of 1 to 55 carbon atoms; wherein the alkyl or alkenyl groups of $R_1$ and $R_2$ optionally contain one or more hetero atoms selected from O, N and S, and are optionally substituted with common organic functional groups selected from carboxyl, hydroxyl, ether, amide, tertiary amine, chloride or ketone.

16. A process for preparing superabsorbing polyamide fibers derived from polysuccinimide (PSI) comprising:
   i) drawing fibers from the internally plasticized, partially hydrolyzed, crosslinkable, uncrosslinked PSI composition of claim 13; and
   ii) curing the fibers to crosslink succinimide groups of the PSI composition to render the fibers superabsorbent.

17. The process of claim 16 wherein the succinimide groups crosslinked during curing comprise from about 1 to about 30% of the total succinimide groups originally present in the starting PSI.

18. An absorbent article comprising from about 5 to about 90 percent by weight of a superabsorbent fiber composition according to claim 14.

19. The absorbent article of claim 18 further comprising hydrophilic fibers.

20. The absorbent article of claim 19 wherein the superabsorbent fiber composition and the hydrophilic fibers are combined to form a fiber matrix.

21. The absorbent article of claim 18 wherein the absorbent article is a diaper, sanitary napkin, incontinence garment, bandage, meat packing tray absorbent liner, or pet tray liner.

22. An absorbent composition comprising soil and the superabsorbent fiber composition according to claim 14.

23. A process for preparing superabsorbing polyamide film comprising:
   i) reacting about 1 to 20% of the succinimide groups of a polysuccinimide (PSI) with one or more monoamines to form an internally plasticized poly(imide-co-amide) intermediate;
   ii) hydrolyzing about 60 to 90% of the succinimide groups of the poly(imide-co-amide) intermediate of i);
   iii) admixing crosslinker with the partially hydrolyzed poly(imide-co-amide) of ii) under non-crosslinking conditions to form a crosslinkable, uncrosslinked, partially hydrolyzed, internally plasticized PSI composition;
   iv) forming film from the composition of iii); and
   v) subjecting the film to crosslinking conditions to crosslink a portion of uncrosslinked succinimide groups and form the superabsorbing polyamide film.

24. The process of claim 21 wherein the starting polysuccinimide has a weight average molecular weight of at least about 20,000 Daltons.

25. The process of claim 22 wherein the polysuccinimide of i) is prepared by condensation polymerizing L-aspartic acid.

26. The process of claim 21 wherein the succinimide groups crosslinked in step v) comprise about 1 to about 30% of the total succinimide groups present in the starting PSI.

27. The process of claim 23 wherein said process is carried out in an aqueous solution.

28. The process of claim 23 wherein said film is a dry or substantially dry film.

29. A process for preparing a partially hydrolyzed, crosslinkable, internally plasticized polysuccinimide (PSI) film comprising:
   i) reacting about 1 to about 20% of the succinimide groups of a polysuccinimide polymer having a weight average molecular weight of at least about 20,000 Daltons with one or more monoamines to form an internally plasticized poly(imide-co-amide) intermediate; and
   ii) hydrolyzing about 60 to 90% of the succinimide groups of the poly(imide-co-amide) intermediate;
   iii) admixing crosslinker with the partially hydrolyzed poly(imide-co-amide) of ii) under non-crosslinking conditions to form a crosslinkable, uncrosslinked, partially hydrolyzed, internally plasticized PSI composition; and
   iv) forming film from the composition of iii).

30. A process for preparing superabsorbing polyamide film which comprises:
   i) forming film from an internally plasticized, partially hydrolyzed, crosslinkable, uncrosslinked polysuccinimide (PSI) composition; and
   ii) curing the film to crosslink succinimide groups of the PSI composition of i) to render the film superabsorbent.

31. The process of claim 30 wherein the succinimide crosslinked in step ii) comprise about 1 to about 30% of the total succinimide groups present in the PSI prior to internal plasticization and partial hydrolysis.

32. Partially hydrolyzed, internally plasticized, crosslinked, superabsorbing film derived from polysuccinimide.

33. The film of claim 32 comprising a polyamide having at least three divalent or polyvalent moieties randomly distributed along the polymer chain having the following formulas:

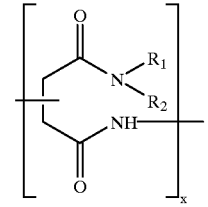

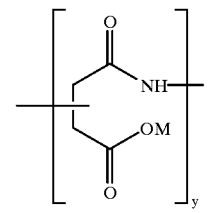

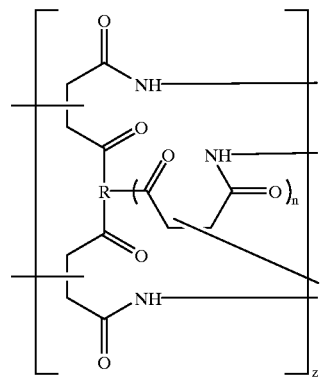

wherein M represents an alkali metal cation, ammonium or quaternary ammonium, R represents a divalent or polyvalent crosslinker moiety, x, y and z represent mole fractions of the moieties in the polyamide and are respectively about 0.01 to about 0.20; about 0.60 to about 0.90 and about 0.01 to about 0.30 wherein the sum of x, y and z is 1.0, and n is an integer from 0 to 4;

wherein $R_1$ represents a hydrogen atom or a straight chain or branched, unsubstituted or substituted alkyl or alkenyl group of 1 to 55 carbon atoms, and $R_2$ represents a hydrogen atom, —OH, or a straight chain or branched, unsubstituted or substituted alkyl or alkenyl group of 1 to 55 carbon atoms; wherein the alkyl or alkenyl groups of $R_1$ and $R_2$ optionally contain one or more hetero atoms selected from O, N and S, and are optionally substituted with common organic functional groups selected from carboxyl, hydroxyl, ether, amide, tertiary amine, chloride or ketone.

34. A process for preparing superabsorbing polyamide film derived from polysuccinimide (PSI) comprising:

i) forming film from the internally plasticized, partially hydrolyzed, crosslinkable, uncrosslinked PSI composition of claim 13; and ii) curing the film to crosslink succinimide groups of the PSI composition to render the film superabsorbent.

35. The process of claim 34 wherein the succinimide groups crosslinked during curing comprise from about 1 to about 30% of the total succinimide groups originally present in the starting PSI.

36. An absorbent article comprising from about 5 to about 90 percent by weight of a superabsorbent film composition according to claim 32.

37. The absorbent article of claim 36 further comprising hydrophilic fibers.

38. The absorbent article of claim 37 wherein the hydrophilic fibers are in the form of a porous matrix.

39. The absorbent article of claim 36 wherein the absorbent article is a diaper, sanitary napkin, incontinence garment, bandage, meat packing tray absorbent liner, or pet tray liner.

40. An absorbent composition comprising soil and the superabsorbent film composition according to claim 32.

* * * * *